(12) United States Patent
Wang et al.

(10) Patent No.: US 10,981,833 B2
(45) Date of Patent: Apr. 20, 2021

(54) MULTI-LAYERED CERAMIC ELECTRONIC COMPONENT AND METHOD FOR MANUFACTURING THE SAME

(71) Applicant: SAMSUNG ELECTRO-MECHANICS CO., LTD., Suwon-si (KR)

(72) Inventors: Byung Yong Wang, Suwon-si (KR); Kwang Sic Kim, Suwon-si (KR); Ji Hun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/287,399

(22) Filed: Feb. 27, 2019

(65) Prior Publication Data

US 2020/0181028 A1 Jun. 11, 2020

(30) Foreign Application Priority Data

Dec. 10, 2018 (KR) ......................... 10-2018-0158271

(51) Int. Cl.
| | |
|---|---|
| *H01G 4/012* | (2006.01) |
| *H01G 4/12* | (2006.01) |
| *H01G 4/30* | (2006.01) |
| *H01G 4/005* | (2006.01) |
| *H01G 4/008* | (2006.01) |
| *C04B 35/468* | (2006.01) |

(Continued)

(52) U.S. Cl.
CPC .......... *C04B 35/4682* (2013.01); *C01G 23/00* (2013.01); *H01G 4/012* (2013.01); *H01G 4/12* (2013.01); *H01G 4/30* (2013.01); *H01G 9/042* (2013.01); *C04B 2235/5445* (2013.01); *C04B 2235/5454* (2013.01)

(58) Field of Classification Search
CPC .......... H01G 4/30; H01G 4/005; H01G 4/008; H01G 4/12; H01G 4/012; H01G 9/042; H10G 4/008; C04B 35/4682; C04B 2235/5445; C04B 2235/5454; C01G 23/00
USPC ... 361/301.4, 321.1, 321.2, 303, 305, 321.3, 361/321.4, 304; 29/25.42
See application file for complete search history.

(56) References Cited

U.S. PATENT DOCUMENTS

| | | | |
|---|---|---|---|
| 2006/0198078 A1* | 9/2006 | Miyauchi | ............... H01G 4/008 361/305 |
| 2016/0308184 A1* | 10/2016 | Joo | .................. C04B 35/63488 |
| 2018/0068797 A1* | 3/2018 | Chigira | .................... H01G 4/30 |

FOREIGN PATENT DOCUMENTS

| | | | |
|---|---|---|---|
| JP | 06339469 A | * | 12/1994 |
| JP | H07-69799 A | | 3/1995 |
| JP | 2004-079994 A | | 3/2004 |

(Continued)

*Primary Examiner* — Arun Ramaswamy
(74) *Attorney, Agent, or Firm* — Morgan, Lewis & Bockius LLP

(57) ABSTRACT

A multi-layered ceramic electronic component has a ceramic body including a dielectric layer and an internal electrode, and an external electrode formed outside of the ceramic body and electrically connected to the internal electrode. The internal electrode includes a conductive metal and a fiber-shaped ceramic additive. For example, the fiber-shaped ceramic additive can include barium titanate ($BaTiO_3$) and, optionally, dysprosium (Dy) and/or barium (Ba). The fiber-shaped ceramic additive may have a diameter of 10 to 200 nm, and a ratio of length to diameter of 10 to 100.

21 Claims, 3 Drawing Sheets

(51) Int. Cl.
*H01G 9/042* (2006.01)
*C01G 23/00* (2006.01)

(56) References Cited

FOREIGN PATENT DOCUMENTS

| | | |
|---|---|---|
| JP | 2009-170848 A | 7/2009 |
| JP | 2013-139599 A | 7/2013 |
| KR | 10-2014-0088420 A | 7/2014 |
| WO | WO-2018039628 A1 * | 3/2018 ............. H01G 4/015 |

* cited by examiner

I-I'

MULTI-LAYERED CERAMIC ELECTRONIC COMPONENT AND METHOD FOR MANUFACTURING THE SAME

CROSS-REFERENCE TO RELATED APPLICATION

This application claims benefit of priority to Korean Patent Application No. 10-2018-0158271 filed on Dec. 10, 2018 in the Korean Intellectual Property Office, the disclosure of which is incorporated herein by reference in its entirety.

BACKGROUND

1. Field

The present disclosure relates to a multi-layered ceramic electronic component and a method for manufacturing the same, and more particularly, to a multi-layered ceramic electronic component having excellent reliability, and a method for manufacturing the same.

2. Description of Related Art

In general, an electronic component using a ceramic material, such as a capacitor, an inductor, a piezoelectric element, a varistor, a thermistor, or the like, may include a ceramic body made of a ceramic material, an internal electrode formed inside of the ceramic body, and an external electrode provided on a surface of the ceramic body to be connected to the internal electrode.

A multi-layered ceramic capacitor among the multi-layered ceramic electronic components may include a plurality of layered dielectric layers, internal electrodes disposed to face each other with one dielectric layer interposed therebetween, and external electrodes electrically connected to the internal electrodes.

Multi-layered ceramic capacitors have been widely used as a component of mobile communications devices such as computers, personal digital assistants (PDAs), and mobile phones, due to relatively compact size, relatively high capacity, relative ease of mounting, and the like.

In line with the recent trend in electrical and electronics industries for electronic devices having high performance as well as compact and slim forms, there has been demand for electronic components having relatively compact size, relatively high performance, and relatively high capacity.

In particular, as the multi-layered ceramic capacitors are being provided with increasingly higher capacitance and more compact sizes, a technique for maximizing electrostatic capacity per unit volume may be necessary.

Therefore, in the case of an internal electrode, high capacitance may be achieved through increasing the number of layers by maximizing the area thereof while minimizing the volume thereof.

However, as the internal electrode becomes thinner, the ratio of thickness to area decreases, thereby increasing sintering driving force. As a result, an increase in breakage and aggregation of the electrode may be intensified.

In addition, when a conductive metal powder having relatively compact size is used for thinning the internal electrode, problems such as aggregation of the internal electrode, breakage of the internal electrode, reduction in effective area of the internal electrode, and the like, may occur due to particle densification behavior in the sintering process.

Further, due to difference in shrinkage behavior between the internal electrode and the dielectric layer, reductions in reliability such as delamination, cracks, or the like, may occur.

Generally, aggregation of the internal electrode and breakage of the internal electrode in the multi-layered ceramic capacitor may be caused by mismatch in shrinkage between the metal powder and the dielectric powder, because a firing temperature of the dielectric layer may be higher than that of the internal electrode layer.

In order to solve such problems, ceramic particles having a shrinkage-suppressing effect upon a firing operation are added to a paste for the internal electrode.

However, as the ceramic particles are also made into small particles, energy required for agglomeration may be increased due to the electrostatic force between the powders. As a result, since the powder may be difficult to be dispersed, defects caused by agglomeration of the ceramic particles may occur.

Therefore, there is a need for a method capable of realizing a relatively compact-sized and high-capacity multi-layered ceramic capacitor having high reliability by suppressing electrode breakage and electrode aggregation that are problematic in forming a relatively thin internal electrode, in order to realize a relatively high-capacity multi-layered ceramic capacitor.

SUMMARY

An aspect of the present disclosure is to provide a multi-layered ceramic electronic component and a method for manufacturing the same, and more particularly, to a multi-layered ceramic electronic component having excellent reliability, and a method for manufacturing the same.

According to an aspect of the present disclosure, a multi-layered ceramic electronic component includes a ceramic body having a dielectric layer and an internal electrode, and an external electrode formed outside of the ceramic body and electrically connected to the internal electrode. The internal electrode includes a conductive metal and a fiber-shaped ceramic additive.

According to another embodiment of the present disclosure, a method for manufacturing a multi-layered ceramic electronic component includes providing a plurality of ceramic green sheets, forming a fiber-shaped ceramic additive by dispersing a ceramic powder in a solvent and electrospinning the solvent through a nozzle, and forming an internal electrode pattern with a conductive paste containing a conductive metal and the fiber-shaped ceramic additive on each of the plurality of ceramic green sheets. A ceramic layered body is formed by layering the ceramic green sheet on which the internal electrode pattern is formed, and the ceramic layered body is fired to form a ceramic body including a dielectric layer and an internal electrode.

According to a further embodiment of the present disclosure, a multi-layered ceramic capacitor has a body including a plurality of internal electrodes alternately stacked with dielectric layers disposed therebetween. Each internal electrode of the plurality of internal electrodes includes a conductive metal having a fiber-shaped ceramic additive mixed therewith.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
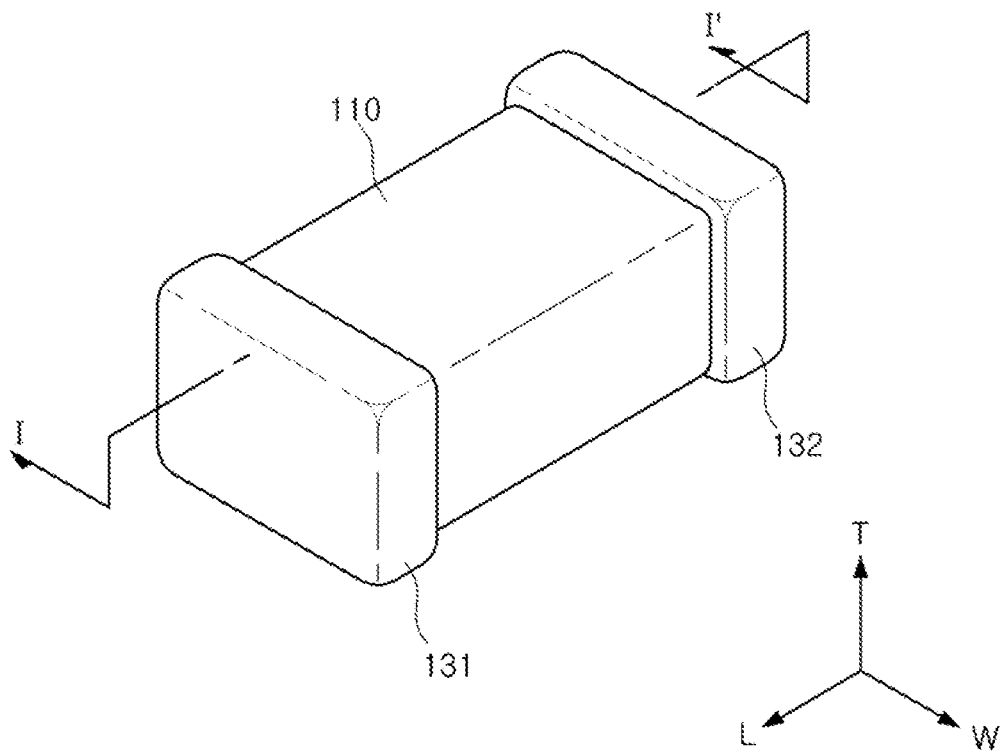
FIG. 1 is a schematic perspective view illustrating a multi-layered ceramic capacitor according to an embodiment of the present disclosure.

Hereinafter, embodiments of the present disclosure will be described in detail with reference to the accompanying drawings. The present disclosure may, however, be embodied in many different forms and should not be construed as being limited to the embodiments set forth herein. Rather, these embodiments are provided such that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

An embodiment of the present disclosure relates to a ceramic electronic component. Examples of the electronic components using a ceramic material may include a capacitor, an inductor, a piezoelectric element, a varistor, a thermistor, and the like. Hereinafter, a multi-layered ceramic capacitor as an example of the ceramic electronic component will be described.

FIG. 1 is a schematic perspective view illustrating a multi-layered ceramic capacitor according to an embodiment of the present disclosure.

Figure 2:
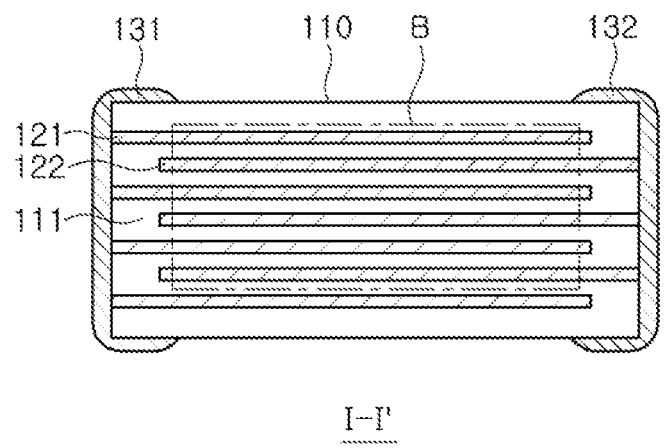
FIG. 2 is a schematic cross-sectional view illustrating a multi-layered ceramic capacitor taken along line I-I' in FIG. 1.

FIG. 2 is a schematic cross-sectional view illustrating a multi-layered ceramic capacitor taken along line I-I' in FIG. 1.

Figure 3:
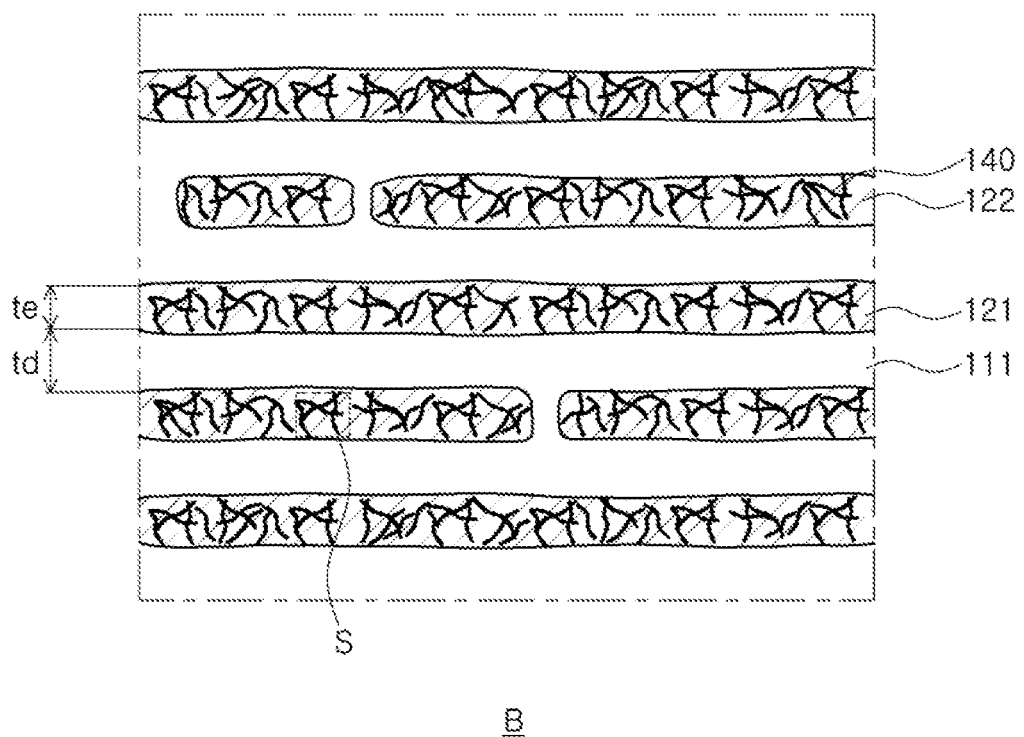
FIG. 3 is an enlarged view of portion B in FIG. 2.

FIG. 3 is an enlarged view of portion B in FIG. 2.

Figure 4:
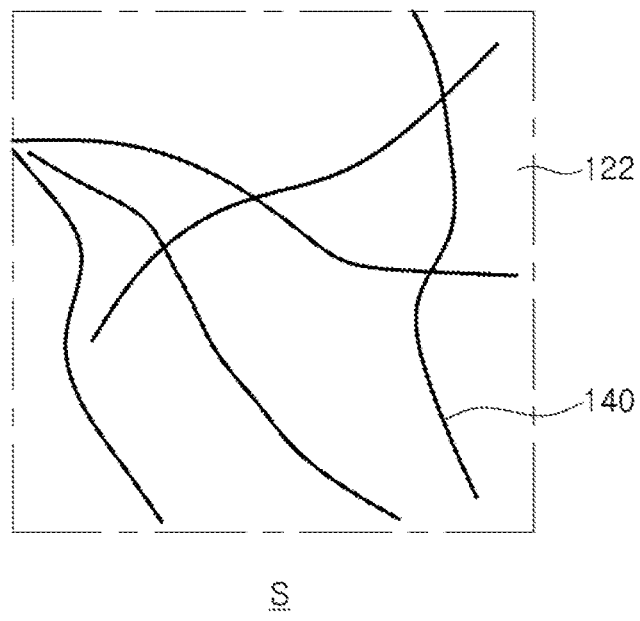
FIG. 4 is an enlarged view of portion S in FIG. 3.

FIG. 4 is an enlarged view of portion S in FIG. 3.

Referring to FIGS. 1 and 2, a multi-layered ceramic capacitor according to an embodiment of the present disclosure may include a ceramic body 110, internal electrodes 121 and 122 formed inside of the ceramic body, and external electrodes 131 and 132 formed outside of the ceramic body 110.

In an embodiment of the present disclosure, a 'length direction' of the multi-layered ceramic capacitor refers to an 'L' direction of FIG. 1, a 'width direction' of the multi-layered ceramic capacitor refers to a 'W' direction of FIG. 1, and a 'thickness direction' of the multi-layered ceramic capacitor refers to a 'T' direction of FIG. 1. The 'thickness direction' may be used in the same sense as the direction in which the dielectric layers are stacked up, e.g., as a 'layering direction' or 'stacking direction.'

A shape of the ceramic body 110 is not particularly limited in shape, but may be a hexahedral shape according to an embodiment of the present disclosure.

The ceramic body 110 may be formed by layering a plurality of dielectric layers 111.

The plurality of dielectric layers 111 constituting the ceramic body 110 may be in a sintered state, and neighboring dielectric layers may be integrated with each other such that boundaries therebetween may not be readily apparent.

The dielectric layer 111 may be formed by sintering a ceramic green sheet containing a ceramic powder.

The ceramic powder is not particularly limited, and may be any ceramic powder that is generally used in the related art.

The ceramic powder may include, for example, a $BaTiO_3$-based ceramic powder, but is not limited thereto.

An example of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially solid-solved in $BaTiO_3$, but is not limited thereto.

In addition, the ceramic green sheet may include a transition metal, rare earth elements, magnesium (Mg), aluminum (Al), or the like, together with the ceramic powder.

A thickness of a single layer in the dielectric layer 111 may be appropriately modified in accordance with a capacitance design of the multi-layered ceramic capacitor.

The thickness of the dielectric layer 111 formed between two neighboring internal electrode layers after a sintering operation may be less than 2.8 μm, but is not limited thereto.

In an embodiment of the present disclosure, the thickness of the dielectric layer 111 may refer to an average thickness.

The average thickness of the dielectric layers 111 may be measured by an image, captured by a scanning electron microscope (SEM), of a cross section of the ceramic body 110 in the length direction, as illustrated in FIG. 2.

For example, with respect to any dielectric layer extracted from an image, captured by the scanning electron microscope (SEM), of a cross section of the ceramic body 110 taken in a length and thickness L-T direction in a central portion of the ceramic body 110 in the width W direction, as illustrated in FIG. 2, thicknesses of the dielectric layer may be measured at thirty points equally spaced apart in the length direction, to measure an average value thereof.

The thirty points equally spaced apart may be measured in a capacitance forming portion which refers to a region in which the internal electrodes 121 and 122 overlap each other.

In addition, when an average thickness of ten or more dielectric layers is measured, the average thickness of the dielectric layers may be further generalized.

Further, when the average value is measured by extending the average value measurement to 10 or more dielectric layers, the average thickness of the dielectric layer can be further generalized.

The internal electrodes 121 and 122 may be disposed inside of the ceramic body 110.

The internal electrodes 121 and 122 may be layered on a ceramic green sheet, and may be formed by sintering, inside of the ceramic body 110 with a single dielectric layer interposed therebetween.

The internal electrodes may be a pair including a first internal electrode 121 and a second internal electrode 122, having different polarities from each other, and may be disposed to face each other in a layering direction of dielectric layers.

As illustrated in FIG. 2, one end of each of the first and second internal electrodes 121 and 122 may be alternately exposed to one of two opposing surfaces of the ceramic body 110 in the length direction.

Although not illustrated, according to an exemplary embodiment of the present disclosure, the first and second internal electrodes may include lead portions, and may be exposed to the same surface of the ceramic body through the lead portions. Alternatively, the first and second internal electrodes may have lead portions, and may be exposed to one or more surfaces of the ceramic body through the lead portions.

A thickness of one of the internal electrodes 121 and 122 is not limited to any particular value, but for example, may be less than 1 μm.

According to an embodiment of the present disclosure, the dielectric layers having internal electrodes therein may be layered in 200 layers or more, which will be described in detail below.

According to an embodiment of the present disclosure, a characteristic configuration may be provided to prevent breakage of electrodes and aggregation of electrodes, which may occur due to thin layer internal electrodes and when a thickness of one of the internal electrodes 121 and 122 is less than 1 μm. However, when a thickness of one of the internal electrodes 121 and 122 is 1 μm or more, reliability may not deteriorate even without using the characteristic configuration in the present disclosure.

The characteristic configuration of the present disclosure described below may be applied to improve reliability when a thickness of one of the internal electrodes 121 and 122 is less than 1 μm.

According to an embodiment of the present disclosure, external electrodes 131 and 132 may be formed outside of the ceramic body 110, and the external electrodes 131 and 132 may be electrically connected to the internal electrodes 121 and 122.

More specifically, the external electrodes 131 and 132 may include a first external electrode 131 electrically connected to the first internal electrode(s) 121 exposed to one surface of the ceramic body 110, and a second external electrode electrically connected to the second internal electrode(s) 122 exposed to the other surface of the ceramic body 110 (opposite to the one surface).

Although not illustrated, additional external electrodes may be formed to be connected to the first and second internal electrodes exposed from the ceramic body.

The external electrodes 131 and 132 may be formed of a conductive paste containing a metal powder.

The metal powder contained in the conductive paste is not particularly limited, and may include, for example, nickel (Ni), copper (Cu), or alloys thereof.

A thickness of each of the external electrodes 131 and 132 may be appropriately determined according to the intended use thereof, or the like, and may be about 10 to 50 μm, for example.

Referring to FIGS. 3 and 4, the internal electrodes 121 and 122 may include a conductive metal and a ceramic additive 140, and the ceramic additive 140 may have a fiber shape.

The conductive metal is not particularly limited to any particular material, and may be, for example, one of silver (Ag), lead (Pb), platinum (Pt), nickel (Ni), and copper (Cu).

The ceramic additive 140 may have a fiber shape, in particular, a nanofiber shape.

In the present disclosure, a fiber shape is a word that is a combination of elongated shapes, and may refer to a linear shape.

The ceramic additive 140 having a fiber shape may be a filled or hollow pillar shape. In addition, the ceramic additive 140 having a fiber shape may be a pipe shape having a passage formed therein.

The pillar shape may include both a circular pillar shape and a polygonal pillar shape, and the pipe shape may include both a circular pipe and a polygonal pipe.

The fiber shape of the present disclosure may be used as a whole, which is a whole of elongated shapes such as the above-mentioned pillar shape and pipe shape.

Generally, aggregation of the internal electrode and breakage of the internal electrode in the multi-layered ceramic capacitor may be caused by mismatch in shrinkage between the metal powder and the dielectric powder, because a firing temperature of the dielectric layer is higher than that of the internal electrode layer.

In order to solve such problems, ceramic particles having a shrinkage-suppressing effect upon firing may be added to a paste for the internal electrode.

However, as the ceramic particles are also made into small particles, energy to agglomerate may be increased due to the electrostatic force between the powders. As a result, since the powder may be difficult to be dispersed, defects caused by agglomeration of the ceramic particles may occur.

Particularly, when the ceramic additive injected into the internal electrode paste for suppressing shrinkage during a firing operation of the internal electrode has a single-particle form of particulates, the powder may be difficult to be dispersed due to the electrostatic force between the powders.

According to an embodiment of the present disclosure, since the ceramic additive 140 has a fiber shape and particularly has a nanofiber shape, reliability deterioration, caused by agglomeration between ceramic particles as in the related art, may be prevented.

As a result, dispersion stability of the ceramic additive on the internal electrode paste may be secured.

In addition, since the nanofiber-shaped ceramic additive 140 blocks and traps movement of the conductive metal in the internal electrode, aggregation of the internal electrode and breakage of the internal electrode may be solved.

For example, since the nanofiber-shaped ceramic additive 140 functions as a structure in the internal electrode, and functions to block and trap movement of the conductive metal in the internal electrode during a high-temperature sintering operation, sintering and firing of the internal electrode may be controlled.

Therefore, since aggregation of the internal electrode and breakage of the internal electrode are prevented, electrode connectivity and reliability may be improved.

As described above, according to an embodiment of the present disclosure, the internal electrodes 121 and 122 may include a conductive metal and a fiber-shaped ceramic additive 140 to suppress shrinkage of the internal electrode during the sintering operation.

The fiber-like ceramic additive 140 is not limited to any particular material as long as it can suppress the internal electrodes from shrinking during the sintering operation, and for example, may be at least one of a non-metal material and a metal oxide.

Specifically, according to an embodiment of the present disclosure, the fiber-shaped ceramic additive 140 may be barium titanate ($BaTiO_3$).

In addition, the non-metal material and the metal oxide may include, for example, $ZrO_2$, $Al_2O_3$, TiN, SiN, AlN, TiC, SiC, WC, or the like, but are not limited thereto.

The fiber-shaped ceramic additive 140 may further include at least one of dysprosium (Dy) and barium (Ba), in addition to the main component such as barium titanate ($BaTiO_3$).

The fiber-shaped ceramic additive 140 may further include at least one element selected from the group consisting of dysprosium (Dy) and barium (Ba), such that the firing may be delayed and the shrinkage-suppressing effect of the internal electrode may be further improved.

According to an embodiment of the present disclosure, the ceramic additive 140 may be a polymer/ceramic composite in which a polymer is combined with a ceramic.

The polymer may be anyone or more of polyvinyl butyral (PVB), polyvinyl alcohol (PVA), polyvinylpyrrolidone (PVP), polystyrene (PS), and Ethyl Cellulose (EC), which is not soluble in the solvent for the internal electrode paste containing the conductive metal, but is not limited thereto.

According to an embodiment of the present disclosure, the ceramic additive 140 is a polymer/ceramic composite in which a polymer is combined with a ceramic. The nanofiber-shaped polymer additive 140 may function as a structure in the internal electrode, and may function to block and trap movement of the conductive metal in the internal electrode during a high-temperature sintering operation.

Therefore, since aggregation of the internal electrode and breakage of the internal electrode are prevented, electrode connectivity and reliability may be improved.

Figure 5:
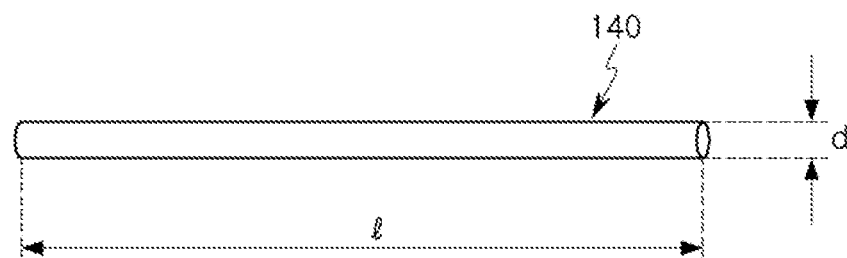
FIG. 5 is an enlarged view illustrating a single fiber of a fiber-shaped ceramic additive.

FIG. 5 is an enlarged view illustrating only one fiber-shaped ceramic additive.

Referring to FIG. 5, a fiber-shaped ceramic additive 140 may have a diameter (d) of 10 to 200 nm.

Since the fiber-shaped ceramic additive 140 has a diameter (d) of 10 to 200 nm, the fiber-shaped ceramic additive 140 may have a nanofiber shape, firing shrinkage of the internal electrode may be suppressed due to addition thereof into an internal electrode of a thin film, and aggregation of the internal electrode and breakage of the internal electrode may be prevented.

The fiber-shaped ceramic additive 140 may have a ratio ($l/d$) of length ($l$) to diameter (d) of 10 to 100, such that a length ($l$) may be 10 to 100 times greater than the diameter (d) thereof.

According to an embodiment of the present disclosure, the fiber-shaped ceramic additive 140 may have a nanofiber shape by satisfying a diameter (d) of 10 to 200 nm and a ratio ($l/d$) of length ($l$) to diameter (d) of 10 to 100.

When the ratio ($l/d$) of length ($l$) to diameter (d) is less than 10, since the length of the ceramic additive is relatively short, beneficial effects of preventing and trapping the conductive metal as a structure in the internal electrode may be deteriorated, and problems such as aggregation of the internal electrode and breakage of the internal electrode may occur.

Meanwhile, when the ratio ($l/d$) of length ($l$) to diameter (d) exceeds 100, since a length of the ceramic additive is too long to be disposed from the internal electrode to the dielectric layer, negative effects such as breakage of the electrode may occur.

Meanwhile, referring to FIG. 3, in a multi-layered ceramic electronic component according to an embodiment of the present disclosure, a thickness (td) of the dielectric layer 111 and a thickness (te) of the internal electrode 121 or 122 may satisfy the relationship td>2×te.

For example, according to an embodiment of the present disclosure, the thickness (td) of the dielectric layer 111 may be greater than twice the thickness (te) of the internal electrode 121 or 122.

Generally, high voltage electric field electronic components have a reliability problem due to a decrease in insulation breakdown voltage under a relatively high voltage environment.

The multi-layered ceramic capacitor according to an embodiment of the present disclosure may prevent a decrease in insulation breakdown voltage under a relatively high voltage environment, and may improve insulation breakdown voltage characteristics by adopting a structure in which the thickness (td) of the dielectric layer 111 is greater than twice the thickness (te) of the internal electrode 121 or 122 to increase a thickness of the dielectric layer, which is a distance between the internal electrodes.

When the thickness (td) of the dielectric layer 111 is twice or less than the thickness (te) of the internal electrode 121 or 122, the insulation breakdown voltage may be reduced due to a relatively thin thickness of the dielectric layer, which is a distance between the internal electrodes.

The thickness (te) of the internal electrode may be less than 1 μm, and the thickness (td) of the dielectric layer may be less than 2.8 μm, but are not limited thereto.

According to another embodiment of the present disclosure, there is provided a method for manufacturing a multi-layered ceramic electronic component. The method includes preparing a ceramic green sheet, preparing a fiber-shaped ceramic additive by dispersing a ceramic powder in a solvent and electrospinning the solvent through a nozzle, and forming an internal electrode pattern with a conductive paste containing a conductive metal and the fiber-shaped ceramic additive. A ceramic layered body is formed by layering the ceramic green sheet on which the internal electrode pattern is formed, and the ceramic layered body is fired to form a ceramic body including a dielectric layer and an internal electrode.

Hereinafter, a method for manufacturing a multi-layered ceramic capacitor according to another embodiment of the present disclosure will be described.

According to an embodiment of the present disclosure, a plurality of ceramic green sheets may be prepared. The ceramic green sheet may be manufactured by mixing a ceramic powder, a binder, a solvent, and the like, with one another to prepare a slurry and producing the slurry in a sheet shape having a thickness of several micrometers by a doctor blade method. Then, the ceramic green sheet may be sintered to form one dielectric layer 111 as illustrated in FIG. 2.

Next, after the ceramic powder is dispersed in a solvent, the solvent is electrospun through a nozzle to prepare a fiber-shaped ceramic additive.

The fiber-shaped ceramic additive may be provided through an apparatus for manufacturing the ceramic additive.

Figure 6:
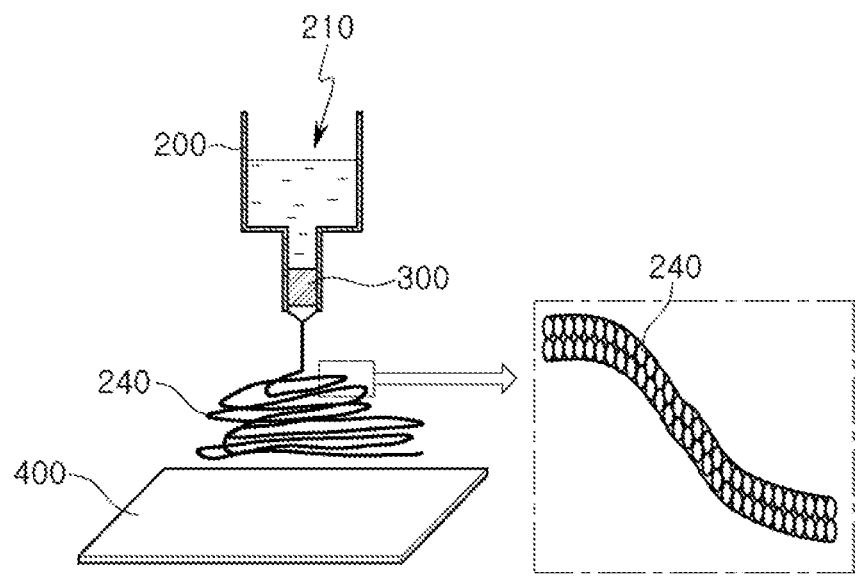
FIG. 6 is a schematic view illustrating an apparatus for producing a fiber-shaped ceramic additive.

FIG. 6 is a schematic view illustrating an apparatus for producing a fiber-shaped ceramic additive.

Referring to FIG. 6, a ceramic slurry 210 in which a ceramic powder is dispersed in a solvent may be introduced into a reaction chamber 200, and may then be subjected to high-voltage electrospinning through a nozzle 300 to form a fiber-like ceramic additive 240.

An apparatus for producing the fiber-shaped ceramic additive may further include a collector 400 for receiving the fiber-shaped ceramic additive 240 produced by the high-voltage electrospinning.

As illustrated in FIG. 6, the fiber-shaped ceramic additive 240 may have a cylindrical shape, such as that of a long and thin filament, by high-voltage electrospinning in the form of a molten ceramic powder.

Next, an internal electrode pattern may be formed by applying a conductive paste for an internal electrode to each ceramic green sheet. The internal electrode pattern may be formed by a screen printing method or a gravure printing method.

The conductive paste for an internal electrode may include a conductive metal and the fiber-shaped ceramic additive, and the additive may be one or more of a non-metal material and a metal oxide.

The conductive metal may include nickel. The fiber-shaped ceramic additive may include barium titanate as the metal oxide.

Thereafter, the ceramic green sheets on which the internal electrode pattern is formed may be layered, and compressed by being pressed in a layering direction. Thus, a ceramic layered body in which an internal electrode pattern is formed may be produced.

Next, the ceramic layered body may be cut per region corresponding to one capacitor to be manufactured in a chip form.

At this time, the ceramic layered body may be cut such that ends of the internal electrode patterns are alternately exposed through side surfaces.

Thereafter, the layered body manufactured in the chip form may be fired to form a ceramic body.

The firing process may be performed in a reducing atmosphere. In addition, the firing process may be performed by controlling a temperature raising rate, but the temperature raising rate may be 30° C./60 s to 50° C./60 s at 700° C. or less.

According to an embodiment of the present disclosure, since the ceramic additive 140 has a fiber shape and particularly has a nanofiber shape, reliability deterioration, caused by agglomeration between ceramic particles as in the related art, may be prevented.

As a result, dispersion stability of the ceramic additive on the internal electrode paste may be secured.

In addition, since the nanofiber-shaped ceramic additive 140 blocks and traps movement of the conductive metal in the internal electrode, aggregation of the internal electrode and breakage of the internal electrode may be solved.

For example, since the nanofiber-shaped ceramic additive 140 functions as a structure in the internal electrode, and functions to block and trap movement of the conductive metal in the internal electrode during a high-temperature sintering operation, sintering and firing of the internal electrode may be controlled.

Therefore, since aggregation of the internal electrode and breakage of the internal electrode are prevented, electrode connectivity and reliability may be improved.

Next, the external electrode may be formed to cover a side surface of the ceramic body and electrically connect to the internal electrodes exposed at the side surface of the ceramic body. Thereafter, a plated layer of nickel, tin or the like may be formed on the surface of the external electrode.

According to an embodiment of the present disclosure, since the ceramic additive added for inhibiting firing shrinkage in the internal electrode has a nanofiber shape, aggregation of the internal electrode and breakage of the internal electrode may be reduced to thereby implement multi-layered ceramic capacitors having improved electrode connectivity and reliability.

While exemplary embodiments have been shown and described above, it will be apparent to those skilled in the art that modifications and variations could be made without departing from the scope of the present disclosure as defined by the appended claims.

What is claimed is:

1. A multi-layered ceramic electronic component comprising:
a ceramic body including a dielectric layer and an internal electrode; and
an external electrode formed outside of the ceramic body and electrically connected to the internal electrode, wherein the internal electrode comprises a conductive metal and a plurality of fiber-shaped ceramic additives in tangled contact with each other.

2. The multi-layered ceramic electronic component according to claim 1, wherein the fiber-shaped ceramic additive comprises barium titanate ($BaTiO_3$).

3. The multi-layered ceramic electronic component according to claim 2, wherein the fiber-shaped ceramic additive further comprises at least one element selected from the group consisting of dysprosium (Dy) and barium (Ba).

4. The multi-layered ceramic electronic component according to claim 1, wherein the fiber-shaped ceramic additive is a polymer/ceramic composite in which a polymer is combined with a ceramic.

5. The multi-layered ceramic electronic component according to claim 4, wherein the polymer in the fiber-shaped ceramic additive comprises at least one of polyvinyl butyral (PVB), polyvinyl alcohol (PVA), polyvinylpyrrolidone (PVP), polystyrene (PS), and Ethyl Cellulose (EC).

6. The multi-layered ceramic electronic component according to claim 1, wherein the fiber-shaped ceramic additive has a diameter of 10 to 200 nm.

7. The multi-layered ceramic electronic component according to claim 1, wherein the fiber-shaped ceramic additive has a ratio of length to diameter of 10 to 100.

8. The multi-layered ceramic electronic component according to claim 1, wherein a thickness (te) of the internal electrode is less than 1 μm.

9. The multi-layered ceramic electronic component according to claim 8, wherein a thickness (td) of the dielectric layer and the thickness (te) of the internal electrode satisfy the relationship td>2×te.

10. The multi-layered ceramic electronic component according to claim 1, wherein a thickness (td) of the dielectric layer is less than 2.8 μm.

11. The multi-layered ceramic electronic component according to claim 1, wherein a thickness (td) of the dielectric layer and a thickness (te) of the internal electrode satisfy the relationship td>2×te.

12. A method for manufacturing a multi-layered ceramic electronic component, comprising:
providing a plurality of ceramic green sheets;
forming a fiber-shaped ceramic additive by dispersing a ceramic powder in a solvent and electrospinning the solvent through a nozzle;
forming an internal electrode pattern with a conductive paste containing a conductive metal and the fiber-shaped ceramic additive on each of the plurality of ceramic green sheets;
forming a ceramic layered body by layering the ceramic green sheets on which the internal electrode pattern is formed; and
firing the ceramic layered body to form a ceramic body including a dielectric layer and an internal electrode, wherein the internal electrode comprises the conductive metal and a plurality of the fiber-shaped ceramic additive in tangled contact with each other.

13. The method of claim 12, wherein the fiber-shaped ceramic additive comprises barium titanate ($BaTiO_3$).

14. The method of claim 12, wherein the forming the fiber-shaped ceramic additive is performed by dispersing the ceramic powder further comprising a polymer in a solvent to allow the ceramic additive to form a polymer/ceramic composite in which a polymer is combined with a ceramic.

15. The method of claim 14, wherein the polymer comprises at least one of polyvinyl butyral (PVB), polyvinyl alcohol (PVA), polyvinylpyrrolidone (PVP), polystyrene (PS), and Ethyl Cellulose (EC).

16. The method of claim 12, wherein the fiber-shaped ceramic additive is formed to a diameter of 10 to 200 nm.

17. The method of claim 12, wherein the fiber-shaped ceramic additive is formed to a ratio of length to diameter of 10 to 100.

18. A multi-layered ceramic capacitor comprising:
a body comprising a plurality of internal electrodes alternately stacked with dielectric layers disposed therebetween,
wherein each internal electrode of the plurality of internal electrodes includes a conductive metal having, disposed therein, a plurality of fiber-shaped ceramic additives in tangled contact with each other.

19. The multi-layered ceramic capacitor of claim 18, wherein the fiber-shaped ceramic additive mixed in each internal electrode of the plurality of internal electrodes has a length 10 to 100 times greater than a diameter (d) thereof.

20. The multi-layered ceramic capacitor of claim 18, wherein a thickness (td) of the dielectric layers stacked between the internal electrodes, and a thickness (te) of the internal electrodes stacked between the dielectric layers, are such that td>2*te.

21. The multi-layered ceramic capacitor of claim 18, wherein the fiber-shaped ceramic additive includes at least one of dysprosium (Dy) and barium (Ba).

* * * * *